United States Patent [19]
Kingsford

[11] Patent Number: 5,498,036
[45] Date of Patent: Mar. 12, 1996

[54] DUAL CONTAINMENT FITTING

[75] Inventor: Kenji A. Kingsford, Devore, Calif.

[73] Assignee: Furon Company, Laguna Niguel, Calif.

[21] Appl. No.: 303,539

[22] Filed: Sep. 9, 1994

[51] Int. Cl.⁶ .................................................. F16L 21/00
[52] U.S. Cl. ...................... 285/138; 285/161; 285/334.5
[58] Field of Search .............................. 285/133.1, 138, 285/161, 334.5, 353

[56] References Cited

U.S. PATENT DOCUMENTS

| | | | |
|---|---|---|---|
| 1,793,887 | 2/1931 | White | 285/334.5 |
| 2,181,002 | 11/1939 | Warner | 285/334.5 |
| 2,410,912 | 11/1946 | Wenk | 285/133.1 |
| 3,861,719 | 1/1975 | Hand | 285/138 |
| 4,799,717 | 9/1989 | Kingsford | 285/341 |
| 4,871,196 | 10/1989 | Kingsford | 285/138 |
| 5,285,826 | 2/1994 | Sanders et al. | 285/133.1 |

FOREIGN PATENT DOCUMENTS

504685  9/1992  European Pat. Off. ............... 285/161

OTHER PUBLICATIONS

Drawing of a fitting which was available in the marketplace at the time the application was filed (Sep. 1994).

Primary Examiner—Eric K. Nicholson
Assistant Examiner—Heather Chun Shackelford
Attorney, Agent, or Firm—Christie, Parker & Hale

[57] ABSTRACT

A dual containment fitting comprises an intermediate annular body having a bore therethrough and an outside surface including a nose portion at one end and a threaded portion adjacent the nose portion. The bore includes a threaded portion opposite the nose portion, a collar adjacent the threaded portion, a sleeve adjacent the collar, and an annular shoulder between the sleeve and collar. An annular fitting body has a bore therethrough and an outside surface including a nose portion at one end that is inserted into a flared end portion of an inner tube, and a threaded portion adjacent the nose portion. The nose portion of the fitting body is inserted within the intermediate body bore and is threadably engaged with the intermediate body bore about respective threaded portions, compressively engaging the flared end between the nose portion and the annular shoulder to form a first attachment fitting. The nose portion of the intermediate body is inserted into a flared end portion of an outer tube disposed concentrically around the inner tube. An annular nut has a bore therethrough and is disposed around the outer tube at the flared end. The nut bore has a threaded portion at one end and a non-threaded portion adjacent the threaded portion having an annular shoulder at an opposite end. The flared end portion of the outer tube is compressively engaged between the nose portion of the intermediate body and the annular shoulder of the nut bore by threadable engagement of the threaded nut bore around a threaded portion of the intermediate body to form a second attachment fitting.

21 Claims, 5 Drawing Sheets

DUAL CONTAINMENT FITTING

FIELD OF THE INVENTION

This invention relates generally to an improved fitting arrangement which creates a dual seal by means of compressive engagement with the ends of concentric inner and outer plastic tubes.

BACKGROUND OF THE INVENTION

Fitting arrangements for effecting a compressive sealed engagement to the ends of non-threaded plastic tubing are well known. Such fitting arrangements are disclosed in U.S. Pat. No. 4,799,717 and can be understood by referring to FIG. 1 herein. The known fitting arrangement 10 conventionally employs a fitting body 12 which has a tubular collar 14 which telescopes onto an end portion 16 of a plastic tube 18. The collar 14 is threadably engaged with an annular nut 20 which surrounds the collar. The annular nut 20 and collar 14 have an opposed interior flared seat 22 and tapered bore 24, respectively. A ferrule ring 26 and a gripper ring 28 are deposed in surrounding relationship to the plastic tube 18 between the opposed flared seat 22 and tapered bore 24 surfaces, respectively.

Figure 1:
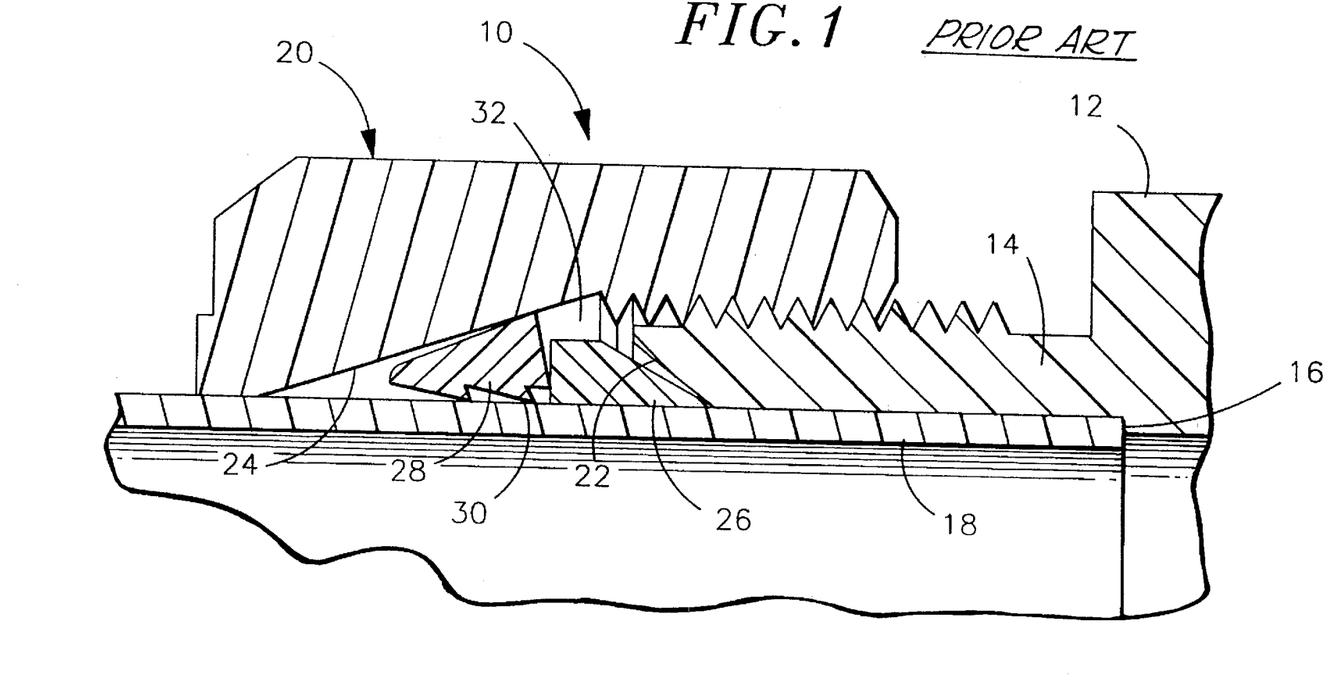
FIG. 1 is a semi-schematic fragmentary cross-sectional side elevation of a prior art fitting arrangement for a single plastic tube.

The ferrule and gripper rings each have exterior surfaces which cooperate with the adjacent surface of the flared seat and tapered bore. The gripper ring 28 also has interior teeth 30 adapted to bite into the plastic tube 18. Threading the nut 20 onto the collar 14 causes axial compression of the ferrule and gripper rings 26 and 28 between the opposed-flared seat 22 and tapered bore 24, and effects radial compression of these rings into sealing engagement with the plastic tube. Fitting arrangements of this type are extensively used in conjunction with plastic tubes which confine and transport dangerous fluids, for example, fluids that are at a high temperature or which are corrosive, such as strong acids or bases. Such dangerous fluids are used extensively in the semiconductor processing industry.

Fitting arrangements of the above-mentioned type are not without their disadvantages, however, as the plastic tubing is only compressively engaged within the collar by the action of the ferrule and gripper ring against the relatively deformable tubing sidewall. Accordingly, over time and exposure to temperature cycling, the sidewall of the plastic tube may deform radially inwardly in response to the inwardly directed compression force of the ferrule and gripper rings. This sidewall deformation may cause the plastic tube to loosen from its engagement within the collar. Depending on the extent of sidewall deformation, a sufficient gap may be created between the collar 14 and annular nut 20 that can not be accommodated by the interaction of the ferrule and gripper rings, thereby forming a leak path for the transported fluid to exit the attachment fitting 10 from the tube end 16, along the collar 22, past the tapered bore 24, and into the surrounding environment. Additionally, any fluid that is leaks past the collar 22 may pass from the fitting arrangement to the surrounding environment via the threaded coupling between the fitting body 12 and the annular nut 20.

Fitting arrangements of the above-mentioned type include a space 32 that exists between the tapered bore 24 and the outside wall of the tube 18. Upon deformation of the tube sidewall, due to the radially directed compression force of the ferrule and gripper rings against the tube, the transported fluid is allowed to pass from the end portion 16 of the tube along the collar 14 and can collect within the space 32 to form a hold-up volume of the fluid within the fitting arrangement. The formation of such a hold-up volume within the fitting arrangement is not desirable as the collected fluid may cause deterioration of surrounding fitting arrangement members. Additionally, such collected fluid may be a source of contamination if the transported fluid being routed by the tubing is changed to a different type, or may be the source of bacterial contamination in pure water systems.

Fitting arrangements such as those described above for use with a single plastic tube can also be used with concentric inner and outer plastic tubes as is disclosed in U.S. Pat. No. 4,871,196, and as described with reference to FIG. 2. The fitting arrangement 34 includes an inner plastic tube 36 having an end portion 38 engaged within a collar 40 of an annular fitting body 42. The collar 40 is threadably engaged with an intermediate annular body 44 that surrounds the collar 40 and the inner plastic tube 36 therein. A first ferrule 46 and first gripper ring 48 are positioned circumferentially around an outside surface of the inner tube between adjacent first flared seat 50 and first tapered bore 52 surfaces, respectively. Threaded engagement of the intermediate annular body 44 and the annular fitting body 42 causes the first flared seat 50 and first tapered bore 52 to be brought axially together, thereby effecting inwardly directed compression of the first ferrule 46 and first gripper ring 48 against the sidewall of the inner tube 36 to form a first attachment fitting.

Figure 2:
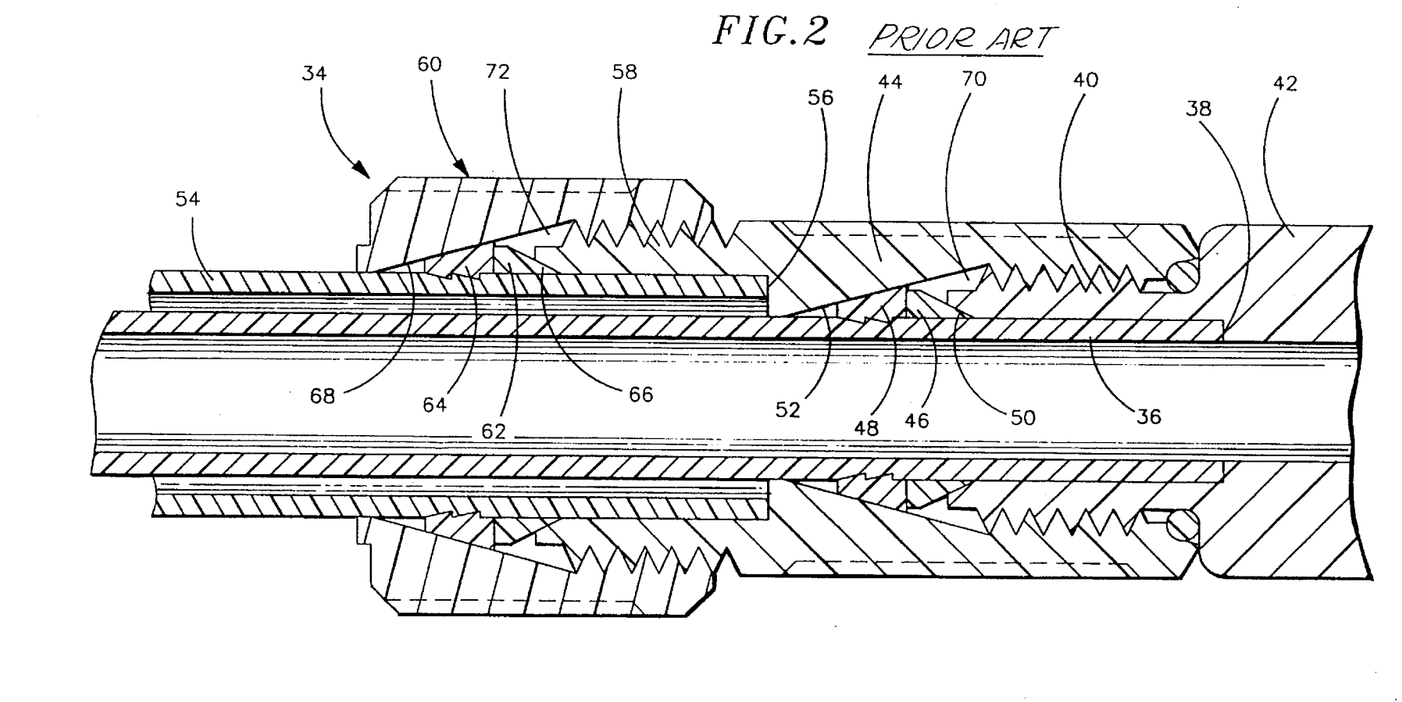
FIG. 2 is a semi-schematic fragmentary cross-sectional side elevation of a prior art fitting arrangement for two concentric plastic tubes.

The fitting arrangement 34 includes an outer plastic tube 54 having an end portion 56 engaged within a collar 58 of the intermediate annular body 44. The collar 58 is threadably engaged with an annular body 60 that surrounds the collar 58 and the outer plastic tube 54. A second ferrule 62 and second gripper ring 64 are positioned circumferentially around an outside surface of the outer tube 54 between adjacent second flared seat 66 and second tapered bore 68 surfaces, respectively. Threaded engagement of the annular body 60 and the intermediate annular body 44 causes the second flared seat 66 and second tapered bore 68 to be brought axially together, thereby effecting inwardly directed compression of the second ferrule 62 and second gripper ring 64 against the sidewall of the outer tube 56 to form a second attachment fitting. The second attachment fitting is positioned concentrically around the inner plastic tube 36.

The use of fitting arrangements which accommodate concentric inner and outer plastic tubes in sealed engagement is desirable because the outer tube provides containment for any leakage of fluids from the inner tube through which the fluids are being transported. Additionally, if desired, heated or cooled fluids can be transported through the outer tube to heat or cool fluids flowing through the inner tube.

However, the use of the concentric fitting arrangements described above that incorporate the gripper and ferrule ring type fittings possess the same inherent problems that were described with regard to the single tube fitting arrangement; namely, leakage due to the deformation of the tubing sidewalls and unwanted collection of transport fluids in spaces 70 and 72 that exist between the annular fitting body 42 and the intermediate annular body 44, and the intermediate annular body 44 and the annular body 60, respectively. Although leakage of fluid transported within the inner tube can arguably be contained by operation of the concentric outer tube, transport fluid contained within the outer tube can leak from the second attachment fitting to the surrounding environment in the same manner as described above for the single tube fitting arrangement.

Single tube fitting arrangements that do not make use of ferrule and gripper rings but, rather, incorporate compression-type attachment members are also known in the art. Such fittings are described as flared-type fittings and are used to seal the end of a single plastic tube. In the flare-type fitting arrangement, a sidewall portion of a flared portion of a plastic tube is pinched between a first attachment member positioned at a location along an inside diameter of the tube and a second attachment member positioned adjacent the first member at a location along an outside diameter of the tube. The first and second attachment members are threadably engaged with one another and tightened to cause the members to be brought axially together, thereby sandwiching the wall of the flared portion of the tube therebetween and forming an attachment fitting. The advantage of using the flared-type fitting is that the attachment fitting does not depend on the compressive engagement against a deformable member, as is the case with the above-described ferrule/gripper-type assemblies. Rather, the attachment fitting is formed by sandwiching the tube sidewall between two non-deformable attachment members.

Although the flared-type fitting reduces the problem of leakage about the attachment fitting, in view of the aggressive nature of the caustic chemicals and process conditions that are used in the semiconductor manufacturing industry, it is desirable that a secondary containment be used in conjunction with the tubing and attachment fittings for purposes of minimizing any health danger or environmental hazard that may result upon leakage of such chemicals from the tubing and/or the attachment fittings to the environment.

It is, therefore, desirable that a fitting arrangement be constructed to provide a sealed containment system for an attachment fitting and related tubing that is used to transport process chemicals. It is desirable that the fitting arrangement provide sealing engagement of both the fluid transport tube and a secondary containment member in a manner that is not prone to leakage due to its depending on a ferrule/gripper ring engagement against a deformable tube wall. It is also desirable that the fitting arrangement not promote collection and/or entrapment of transport fluid during use, and that the fitting arrangement can be manufactured in a manner that is economically feasible and from materials that are widely available.

SUMMARY OF THE INVENTION

A dual containment fitting for accommodating sealing attachment of concentric inner and outer tubes is provided in accordance with practice of principles of the present invention. The dual containment fitting eliminates the potential for leak development at the fitting due to thermally induced deformation of the tubing sidewall, and eliminates collection and/or entrapment of the process fluid being transported.

The dual containment fitting comprises an annular fitting body, an intermediate annular body and an annular nut, each of which has first and second ends and a bore therethrough. The fitting body is treadably engaged at its first end within the bore at the first end of the intermediate body. The flared end portion of the inner tube is compressibly engaged between the fitting body and the intermediate body to form a first air- and water-tight seal therebetween. The annular nut is threadably engaged at its first end about the second end of the intermediate body. The flared portion of the outer tube is compressibly engaged between the intermediate body and the nut to form a second air- and water-tight seal therebetween.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

Figure 3:
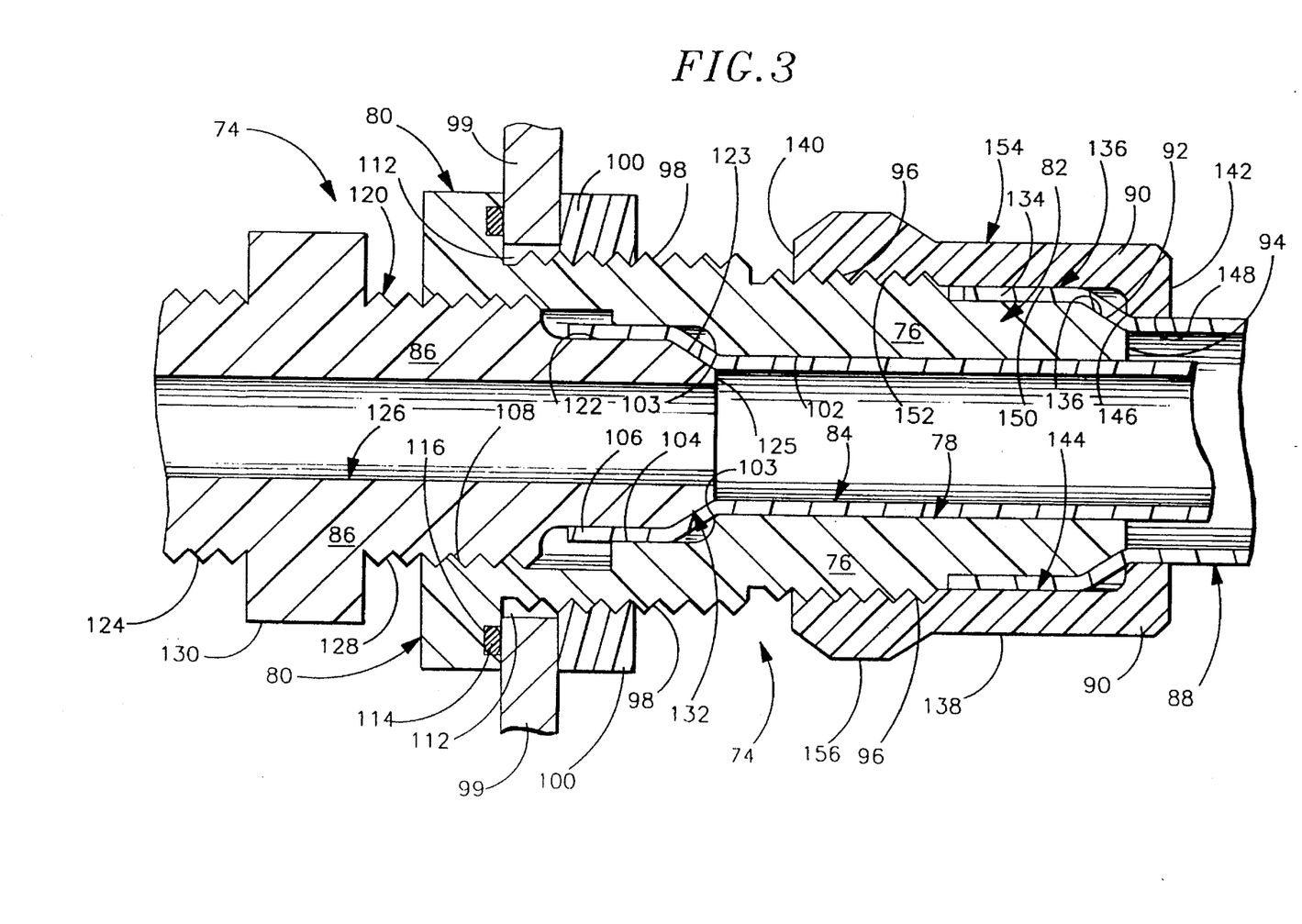
FIG. 3 is a semi-schematic cross-sectional side elevation of a preferred embodiment of a dual containment fitting arrangement for two concentric plastic tubes constructed in accordance with practice of principles of the present invention.

Referring to FIG. 3, a first preferred embodiment of a dual containment fitting 74 constructed according to principles of this invention is shown. The fitting 74 comprises an intermediate annular body 76 having a circular bore 78 that extends therethrough. The intermediate body 76 is configured in the shape of a cylinder having a flanged portion 80 at one end (its first end) and a cylindrical nose portion 82 at an opposite end (its second end). Generally speaking, the intermediate body 76 accommodates the compressive engagement of an inner plastic tube 84 therein between the intermediate body 76 and an annular fitting body 86 that is threadably engaged within the bore at the flanged portion 80 of the intermediate body 76. The intermediate body 76 also accommodates the compressive engagement of an outer plastic tube 88 disposed outside of and concentric with the inner plastic tube 84. The outer tube 88 is compressively engaged between the nose portion 82 of the intermediate body 76 and an annular nut 90 by the threadable engagement of the annular nut with the intermediate body. In this manner the intermediate body 76 accommodates dual attachment of concentric inner and outer tubes 84 and 88, respectively, using flare attachment fittings at the end portions of each inner and outer tube.

The flanged portion 80 can be configured to accommodate installation and placement of the intermediate body 76 through a hole in a wall surface that may be positioned adjacent a process unit and the like to provide a solidly mounted attachment fitting. If desired, the intermediate body 76 can be configured having an end portion that is not flanged. Accordingly, it is to be understood that the intermediate body 76 may have an end portion 80 configured differently than that disclosed and illustrated. For example, the intermediate body may be constructed with an end portion 80 that, rather than having a circular geometry, is hexagonal in shape in the form of a nut to rotate the intermediate body to facilitate threadable engagement with an adjacent fitting members, or to accommodate holding the intermediate body when threadably engaging adjacent fitting members therein by rotation.

The nose portion 82 of the intermediate body 76 is non-threaded and includes a taper 92 on its outside surface near a tip portion 94. A first set of threads 96 on the outside surface of the intermediate body extends from nose portion 82 a predetermined distance towards the flanged portion 80. It is desired that the nose portion 82 be unthreaded to accommodate insertion into a flanged end portion of the outer tube 88, as will be discussed in greater detail below. In a preferred embodiment, the nose portion 82 extends axially along the intermediate body 76 from the tip portion 94 a distance of approximately 19 millimeters (¾ inch) and has an outside diameter of approximately 29 millimeters (1⅛ inches). The first set of threads 96 extends axially along the intermediate body from the nose portion 82 towards the flanged portion 80 a distance of approximately 16 millimeters (⅝ inch), has clockwise configured threads, and has a diameter of approximately 32 millimeters (1¼ inches).

A second set of threads 98 extends along the outside surface of the intermediate body 76 from the first set of threads 96 to the flanged portion 80. The second set of threads 98 has a thread diameter larger than that of the first set of threads 96. In a preferred embodiment, the second set of threads extends along the axis of the intermediate body 76 a distance of approximately 25 millimeters (1 inch), has counterclockwise configured threads, and has a diameter of approximately 35 millimeters (1⅜ inches). It is desired that the second set of threads 98 have a counterclockwise configured thread pattern so that a mounting nut 100 that is threaded onto the second set of threads does not become unthreaded during the threaded attachment of the annular nut 90 onto the first set of threads 96.

The bore 78 of the intermediate body 76 comprises a first non-threaded portion forming a sleeve 102 that extends axially from the tip portion 94 a predetermined distance towards the flanged portion 80. The sleeve 102 has a diameter slightly larger in dimension than an outside diameter of the inner plastic tube 88 to accommodate slidable placement of the inner plastic tube therein. In a preferred embodiment, the sleeve has a diameter of approximately 19 millimeters (¾ inch) and extends a length of approximately 38 millimeters (1½ inches) into the bore 78.

The bore 78 of the intermediate body comprises a second non-threaded portion 104 adjacent the sleeve 102 that forms a collar. The collar 104 extends a predetermined distance towards the flanged portion 80 and has a diameter larger in dimension than the sleeve to accommodate placement of a flared end portion 106 of the inner plastic tube 84 therein. A annular shoulder 103 is defined at the junction between the sleeve 102 and collar 104. In a preferred embodiment, the collar has a diameter of approximately 22 millimeters (⅞ inch) and extends a length of approximately 13 millimeters (½ inch).

The bore 78 of the intermediate body includes a third portion comprising a set of threads 108 adjacent the collar 104. The set of threads 108 extends from the collar 104 to the flanged portion 80 and has a diameter larger in dimension than the collar to accommodate threadable engagement of the annular fitting body 86 therein. In a preferred embodiment, the set of threads 108 has a diameter of approximately 28 millimeters (1⅛ inches), has a clockwise configured thread pattern, and extends a length of approximately 22 millimeters (⅞ inch). Accordingly, in a preferred embodiment, the axial length of the intermediate body 76 is approximately 70 millimeters (2¾ inches).

The intermediate body 76 of the dual containment fitting 74 as described and illustrated is sized to accommodate both the flared attachment of a inner plastic tube 84 within the bore 78, and more particularly, within the collar 104 of the bore, and the flared attachment of an outer plastic tube 88, concentric about the outside diameter of the inner plastic tube, about the nose portion 82. The inner plastic tube has an outside diameter at a non-flared portion of approximately 19 millimeters (¾ inch) and the outer plastic tube has an outside diameter at a non-flared portion of approximately 25 millimeters (1 inch). It is to be understood within the scope of this invention that the dual containment fitting may be sized to accommodate flared attachment of inner and outer tubes having different outside diameters than specifically described.

The inner plastic tube 84 may be made from a material that possesses a good degree of chemical and thermal resistance and is conventionally deformable. Suitable materials for forming the inner plastic tube include fluoropolymeric compounds such as polytetrafluoroethylene (PTFE), fluorinated ethylenepropylene (FEP), perfluoroalkoxy fluorocarbon resin (PFA), polychlorotrifluoroethylene (PCTFE), ethylenechlorotrifluoroethylene copolymer (ECTFE), ethylenetetrafluoroethylene copolymer (ETFE), polyvinylidene fluoride (PVDF), polyvinyl fluoride (PVF) and the like. Particularly preferred inner tubing materials are FEP and PFA. The outer plastic tube 88 may be selected from the same groups of materials previously described for the inner plastic tube.

In a preferred embodiment, the inner tube has a standard tubing shape, while the outer plastic tube has a corrugated shape. The corrugated shape is preferred for the outer tube because the corrugations allow for axial extension or compression of the tube without affecting the inside tube diameter. As is discussed in greater detail below, such extension or compression of the outer tube may be necessary to facilitate attachment of the outer tube to the intermediate body 76 around an inner tube which is already so attached.

Before attaching the inner plastic tube 84 to the intermediate body 76, the intermediate body may be mounted to a flat wall surface 99 and the like by inserting the nose portion 82 into an opening 112 through the wall of sufficient diameter to accommodate both the installation of the second set of threads 98 of the intermediate body therethrough and engagement of the flanged portion 80 against the planar wall surface. The flanged portion 80 comprises an O-ring seal 114 disposed in a circular groove 116 within a backside surface of the flanged end portion to provide a leak-tight seal between the wall surface and the intermediate body 76. The mounting nut 100 is threaded onto the second set of threads 98 and is fastened against the adjacent wall portion to attach the intermediate body to the wall.

Before installing the inner plastic tube 84 into the bore 78 of the intermediate body 76, an end portion of the tube is flared outwardly a predetermined amount. The flaring operation can be accomplished by cold flaring process by using a hand-held flaring tool, or can be accomplished by heating the end portion and using a suitable tool to deform the end portion in a flared configuration. In a preferred embodiment, the end portion of the inner plastic tube is cold flared to form the flared end portion 106. The flared end portion has an outside diameter of approximately 22 millimeters (⅞ inch) and has a length of approximately 13 millimeters (½ inch). A non-flared end (not shown) of the inner plastic tube 84 is inserted into the bore 78 of the intermediate body 76, from the flanged portion 80, and through the sleeve 102 until the flared end portion 106 of the inner tube abuts against the annular shoulder 103 and is housed within the collar 104.

Alternatively, rather than installing a inner tube having a pre-flared end portion into the intermediate body, an end portion of the inner plastic tube can be flared after the end portion has been inserted into the bore 78. In such case, the inner tube 84 is slid into the intermediate body 76 so than an end portion extends a sufficient distance away from the flared end 80 to allow room for the flaring process. Once the end portion has been flared it is slid into the bore 78 until it abuts against the annular shoulder 103 and is housed within the collar 104.

The annular fitting body 86 comprises a cylindrical nose portion 122 at one end (its first end), a threaded end 124 at an opposite end (its second end), and a bore 126 extending therethrough. The nose portion 122 includes a taper 123 at a tip portion 125 and is configured to fit within the collar 104 of the intermediate body. The threaded end portion 124 is configured to accommodate threadable engagement with an adjacent fluid transfer coupling (not shown). The bore 126 has a smooth non-threaded surface having an inside diameter approximately equal to the inside diameter of the inner plastic tube in order to maintain a constant pressure drop through the piping system and avoid unnecessary turbulence in the transferred process fluid. The nose portion 122 is unthreaded to accommodate insertion within the flared end portion 106 of the inner tube. In a preferred embodiment, the nose portion has an outside diameter of approximately 21 millimeters (¹³⁄₁₆ inch) and extends a length of approximately 16 millimeters (⅝ inch) from the tip portion 125.

The outside surface 120 of the annular fitting body 86 includes a set of threads 128 that extends axially from the nose portion 122 a predetermined distance toward the threaded end 124. The set of threads 128 is sized and configured to accommodate threadable engagement with the bore threads 108 of the intermediate body 76. In a preferred embodiment, the set of threads 128 has a diameter of approximately 19 millimeters (1⅛ inches), has a clockwise configured thread pattern and has a length of approximately 16 millimeters (⅝ inch).

The outside surface 120 of the annular fitting body 86 includes an extended diameter portion 130 that extends radially outward from the fitting body and is interposed between the threaded end 124 and the set of threads 128 to facilitate engagement by a tool for purposes of rotating the fitting body. In a preferred embodiment, the extended diameter portion 130 is an integral member of the outside surface 120 and is configured having an hexagonal shape in the form of a nut. The nut 130 provides a gripable surface to rotate the annular fitting body 86 by conventional hand tools and, thereby, facilitate threadable engagement with the intermediate body 76. It is to be understood that aside from the nose portion 122 and the adjacent set of threads 128, the outside surface of the annular fitting body 86 may be configured in a number of different shapes to accommodate different types of fitting applications. For example, in place of the nut 130, the annular fitting body 86 may have an outside surface that is configured in the shape of an elbow or a tee adjacent the threaded portion 128, to effect a change in direction or to effect flow distribution of the process fluid flowing through the inner tube 84.

The nose portion 122 of the annular fitting body is inserted into the flared end portion 106 of the inner plastic tube 84, and the set of threads 128 are threadably engaged with the bore threads 108 of the intermediate body 76, causing the flared end portion 106 to be compressively engaged against the annular shoulder 103 and within the collar 104. The flared end portion 106 is compressively engaged between the taper 123 of the nose portion 122 of the annular fitting body, at an inside diameter, and the annular shoulder 103 and collar 104 of the intermediate body 76, at an outside diameter, to form an air- and water-tight first attachment fitting or seal 132 by snugly fastening together the annular fitting body and intermediate body.

The outer plastic tube 88 has a flared end portion 134 that has been flared in the same manner as previously described for the inner plastic tube. In a preferred embodiment, the flared end portion 134 has an outside diameter of approximately 19 millimeters (1⅛ inches).

After the inner tube is attached to the fitting, the end of the inner tube that extends from the intermediate annular body 76 is inserted into the flared end portion 134 of the outer tube 88, thereby forming a concentric inner and outer tube pair. The nose portion 82 of the intermediate annular body 76 is inserted into the flared end portion 134 of the outer tube. The annular nut 90 is slid along an outside surface of the outer tube and fit over the flared end portion 134. The annular nut 90 is threadably engaged with the intermediate annular body as will be described below in greater detail to compressively engage the flared end portion 134 therebetween and form a second attachment fitting or seal 136.

The annular nut 90 comprises a generally cylindrical housing 138 with an open end 140 at one end (its second end), a partially closed end 142 at an opposite end (its first end), and a bore 144 extending therethrough. The bore 144 includes a first non-threaded portion adjacent the partially closed end that comprises an annular shoulder 146 extending radially inward from the bore 144 a predetermined distance, thereby defining a tube opening 148 at the partially closed end. The tube opening 148 is centrally located in the partially closed end 142 and is coaxial with the bore 144. The tube opening 148 has a diameter approximately equal to the outside diameter of the outer plastic tube 88 to accommodate slidable placement therethrough. In a preferred embodiment, the tube opening 148 has a diameter of approximately 25 millimeters (1 inch).

The bore includes a second non-threaded portion 150 adjacent the annular shoulder 146 that has a diameter larger than the first non-threaded portion. The second non-threaded portion 150 is of sufficient diameter to accommodate the flared end portion 134 of the outer tube 88 therein. In a preferred embodiment, the second non-threaded portion has a diameter of approximately 32 millimeters (1¼ inches). The nut bore 144 comprises a set of threads 152 adjacent the second non-threaded portion 150 that extends to the open end 140 and is configured having a diameter and thread pattern to facilitate threadable engagement with the first set of threads 96 of the intermediate body 76. In a preferred embodiment, the set of threads 152 has a diameter of approximately 32 millimeters (1¼ inches), is threaded in a clockwise direction, and extends a length of approximately 13 millimeters (½ inch).

The annular nut 90 has an outside surface 154 configured in a shape to facilitate rotational movement of the nut 90 by conventional hand tools to effect threadable engagement with the intermediate annular body. In a preferred embodiment, the outside surface is configured having an hexagonal shape. Ridges 156 are disposed around the outside surface 154 adjacent the open end 140 to further facilitate rotational movement of the annular nut 90 by hand.

The annular nut 90 is guided over a non-flared end of the outer plastic tube 88 and slid along a length of the outer tube. The annular nut 90 is slid over the flared end portion 134 that is mounted on the nose portion 82 of the intermediate body 76. The bore threads 152 of the annular nut are threadably engaged with the first set of threads 96 of the intermediate body and the annular nut is rotated until the two members are snugly fastened together to compressively engage the flared end portion 134 between the taper 92 of the nose portion 82 of the intermediate body, at an inside diameter, and the annular shoulder 146 and second non-threaded portion 150 of the annular nut, at an outside surface, thereby forming the second attachment fitting 136. The dual containment fitting constructed in accordance with principles of this invention provides a first attachment fitting 132 that is concentrically positioned within a second attachment fitting 136.

Once the first ends of the inner and outer tubes are secured within the fitting as described above, it may be desired to install the opposite ends of the inner and outer tubes into a second such fitting. In this operation, the second end of the inner tube is mounted in the fitting assembly in the same manner as described above for mounting the first end. As can be seen, if both the inner and outer tubes are of a fixed length, the tubes would have to be cut to precise lengths in order to fit appropriately within the fittings to provide the desired air- and water-tight seals. So that the lengths do not have to be so precise, it is preferred that the outer tubing be of a corrugated design so that its length can be modified. For example, a corrugated tube can be compressed so that the accordion sections collapse, thereby making the tube shorter, or it can be pulled so that the accordion sections expand, thereby lengthening the tube.

Figure 4:
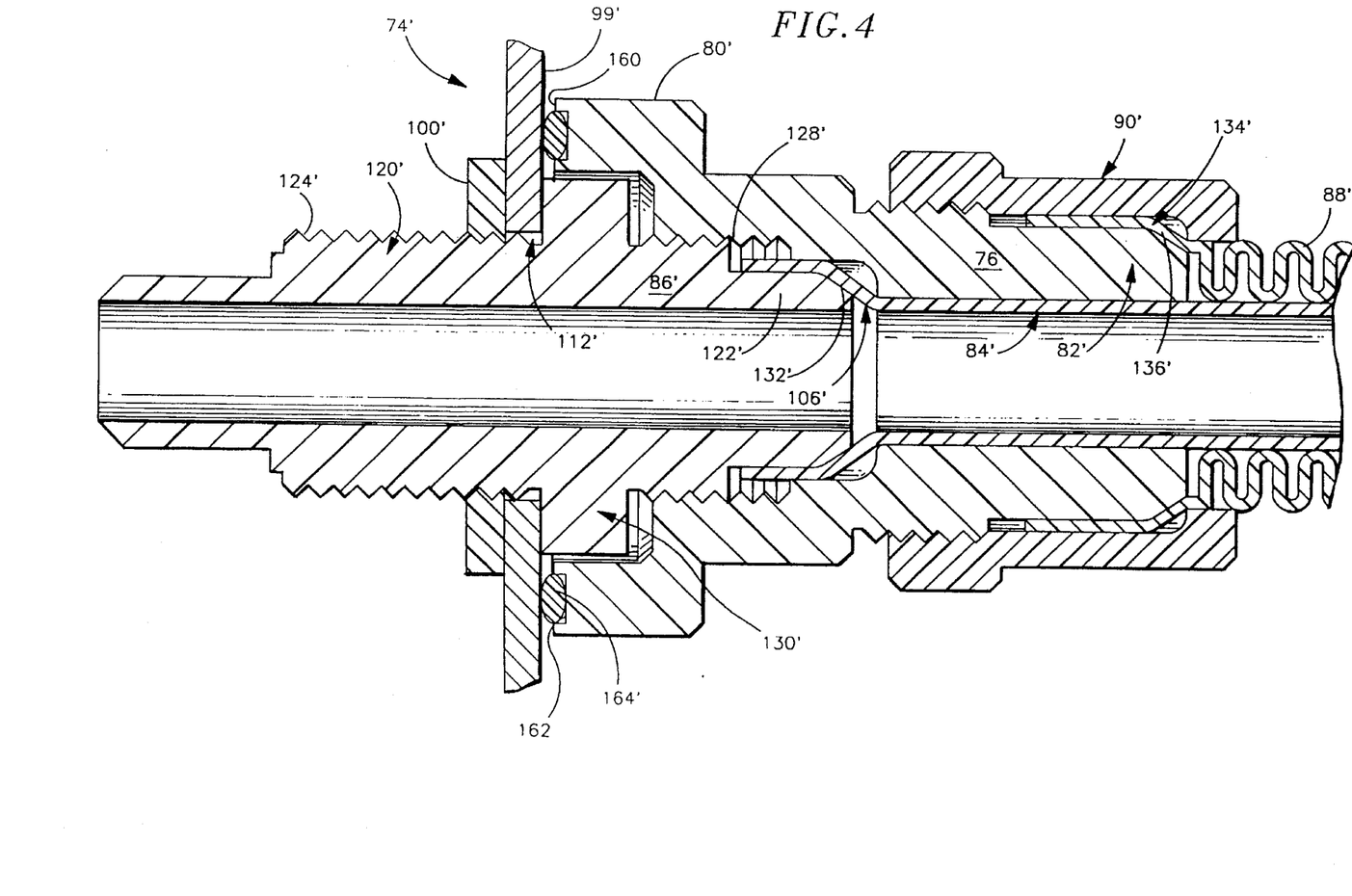
FIG. 4 is a semi-schematic cross-sectional side elevation of another preferred embodiment of a dual containment fitting arrangement for two concentric plastic tubes constructed in accordance with practice of principals of the present invention.

Referring to FIG. 4, there is shown a semi-schematic cross-sectional view of a second preferred embodiment of a dual containment fitting constructed in accordance with practice of principles of this invention. The components of the device of FIG. 4 which are similar to the components identified with reference to FIG. 3 have the same reference numerals with a prime (') designation. The fitting device 74' of this embodiment incorporates essentially the same components as the embodiment shown in FIG. 3 with the exception that the flange 80' on the intermediate body 76' incorporates a sealing means for sealing the intermediate body portion of the fitting against the wall surface 99'. In the present embodiment, the flange 80' has an annular surface 160 facing away from the intermediate body nose portion 82'. A groove 162 is within the annular surface and extends circumferentially therearound. A seal 164, which can be a quad ring or O-ring type seal or the like, is disposed within the groove.

The outside surface 120' of the annular fitting body 86' includes a set of threads 124' along the length of its outer surface at its second end and a set of threads 128' that extend axially from the nose portion 122' a predetermined distance toward the threads 124'. An extended diameter portion 130', i.e., a radially extending flange, is interposed between the set of threads 124' and the set of threads 128'. Upon assembly of the fitting, the second end of the fitting body is inserted into an opening 112' through a flat wall surface 99'. A mounting nut 100' is then threaded onto the set of threads 124' on the fitting body and is tightened against the adjacent wall 99' to securely engage the flange 130' of the fitting body against the wall. Upon tightening the nut 100', the seal 164 in the groove 162 in the intermediate body flange 80' is forced tightly against the flat wall surface 99', thereby forming a gas- and liquid-tight seal around the wall surface.

In this embodiment, the same seals are provided between the fitting and the inner and outer tubes 84' and 88', respectively, as are provided in the embodiment of FIG. 3. Thus, the flared end portion 106' of the inner tube 84' is compressively engaged between the fitting body 86' and the intermediate body 76' to form a first air- and water-tight seal 132' therebetween. The flared end portion 134' of the outer tube 88' is compressively engaged between the intermediate body 76' and the annular nut 90' to form a second air- and water-tight seal 136' therebetween. The provision of the seal between the intermediate body flange seal 164 and the wall 99' is to ensure that any fluid which may possibly leak through the air- and water-tight seal provided by the compressive engagement between the fitting body 86' and the intermediate body 76' on the flared portion of the inner tube will not be allowed to escape to the atmosphere. This embodiment, therefore, provides an extra level of containment for any fluids which may possibly leak past the seal 132'.

Figure 5:
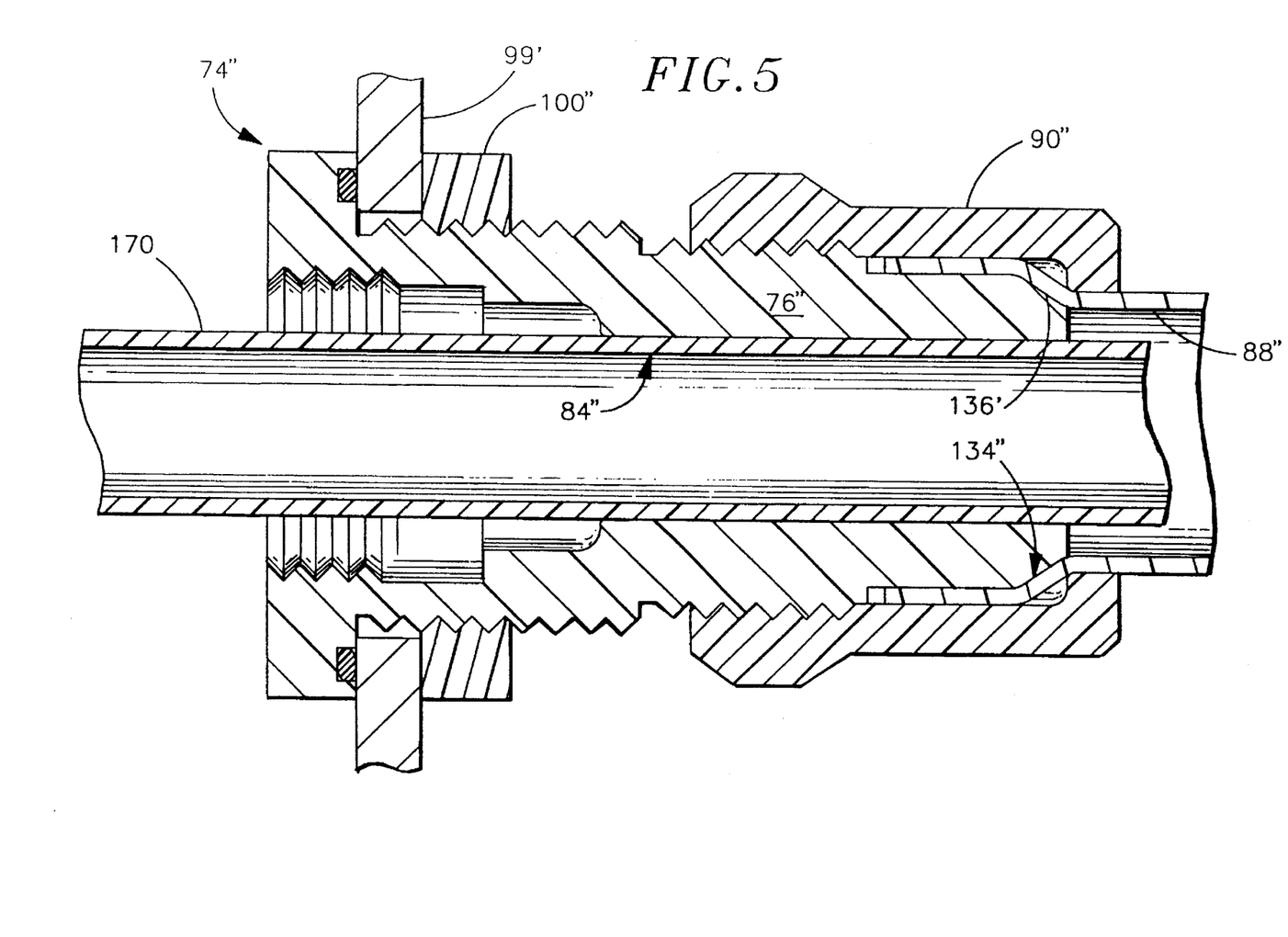
FIG. 5 is a semi-schematic cross-sectional side elevation of yet another preferred embodiment of a dual containment fitting arrangement for two concentric plastic tubes constructed in accordance with practice of principals of the present invention.

In some tubing systems which use a plurality of dual containment fittings, such as those described above with reference to FIGS. 3 and 4, one of the fittings may be provided in the absence of a fitting body. For example, such a system would include one or more fittings as described with reference to FIGS. 3 or 4 and, additionally, may incorporate a fitting arrangement 74" such as that shown in FIG. 5. Components of the device of FIG. 5 which are similar to the components identified with reference to FIGS. 3 and 4 have the same reference numerals but with a double prime (") designation. In this instance, the device 74" incorporates an intermediate body 76" and a nut 90". The flared end portion 134" of the outer tube 88" is compressibly engaged between the intermediate body 76" and the annular nut 90" to form an air- and water-tight seal 136" therebetween. The fitting 74" is attached to the wall 99" of a sealed instrument cabinet. In this embodiment, the device 74" is absent a fitting body, and the end 170 of the inner tube 84" extends into the instrument cabinet.

A key feature of this invention is the use of a flare-type fitting at the attaching end of each inner and concentrically positioned outer plastic tube. The flare-type fitting provided in accordance with practice of principles of the present invention is desired over other types of tube fittings such as those disclosed in U.S. Pat. No. 4,871,196. As was described above, the dual containment fittings defined in the '196 patent are provided by compressive engagement of ferrule and gripper rings against outside wall surfaces of tubing. The ferrule and gripper rings are forced against the outside surface of the tube, gripping the tube wall surface to provide the seal and to thereby resisting outward movement of the tube from the fitting. Rather than physically trapping the tube end between two rigid members, as is the case with the fitting of the present invention, the prior art dual containment attachment method depends on the engagement of rigid members, e.g., the ferrule and gripper rings, against the sidewall of the tube itself. The sidewall of the tube is not a rigid member but is capable of being deformed by the thermal condition of the process fluid that is transferred through the tube.

When the process fluid routed through the tube is at a temperature sufficient to cause tube deformation, the sidewall of the tube near the end portion can collapse from the radially directed force imposed by the ferrule and gripper rings of the prior art fittings. Once the sidewall of the tube deforms and collapses, the rings can no longer effectively engage the tube sidewall, and the attachment of the tube within the fitting is loosened. This loosened condition provides a leak path for process fluid to escape from the end portion of the tube, along the outside surface of the tube within collar, past the rings, and from the fitting to the surrounding environment. Even if the tube is not pulled out of its position within the collar and the temperature of the fluid returns to below deformation temperature, leakage of process fluid can still occur because the previously deformed sidewall will reset with a sidewall diameter or configuration that will not accommodate sealing engagement with the ring. Accordingly, thermal cycling of the process fluid routed through the tube will eventually result in a leak developing at the attachment fitting.

The possibility that such a leak can occur is not desirable, particularly in the semiconductor manufacturing industry where the types of process fluids transported through such tubes and fittings are corrosive materials such as inorganic acids including hydrochloric acid (HCl), hydrofluoric acid (HF), sulfuric acid ($H_2SO_4$), inorganic bases such as sodium hydroxide (NaOH), peroxides, proprietary cleaning and stripping agents of an aggressive chemical nature, and mixtures of the above. Many of these chemical compositions are used at elevated temperatures and are transported at high pressures to enhance the efficiency of the particular chemical operation. For example, concentrated sulfuric acid is used at approximately 150° C. (near its boiling point) for purposes of etching semiconductor chips. Accordingly, the leakage of any such chemical from the fluid handling tubing or attachment fitting to the ground or atmosphere could present a hazard to the environment or a health danger to nearby operators.

The dual containment fitting constructed according to principles of this invention reduces the possibility that such a leak will occur because of the unique arrangement of concentrically positioned flare-type attachment fittings. Experience has shown that flare-type fittings offer a superior method of sealing that is less prone to thermally induced failure. Rather than depending on a deformable member for purposes of engaging and retaining the tube within an attachment body, the inner and concentrically positioned outer tube is each compressively engaged or pinched between two rigid members, i.e., a nose portion and annular shoulder, that are relatively less prone to thermally induced deformation than the inner and outer tubes.

Additionally, the dual containment fitting constructed according to principles of this invention eliminates problems relating to hold-up volume because no leakage can get past the air- and water-tight seals formed by the compressive engagement of the inner tube by the fitting body and intermediate body and the compressive engagement of the outer tube by the intermediate body and nut. On the other hand, with fittings which incorporate grippers and ferrule ring arrangements, a hold-up volume is created between the ferrule ring and the attachment body that can act as a reservoir which can collect and entrap process fluid. The entrapment of process fluids is not desirable, as over time the entrapped fluid can cause the seal area contacting the entrapped fluid to degrade and ultimately leak. Additionally, such collected fluid, i.e., the hold-up volume, may be the source of contamination if the transported fluid being routed by the tubing is changed to a different type, or may be the source of bacterial contamination in pure water systems.

The dual containment fittings constructed according to principles of this invention are useful in a number of applications. The coaxially mounted outer tubing and associated attachment fitting at each end can be used to provide a secondary containment of hazardous chemicals or gases in the primary or inner tubing system for purposes of safety, to meet code and other building/safety requirements, and to provide a method of minimizing the effects of a leak in the primary, i.e., first, piping system. The outer tubing can also be used in conjunction with a leak-detection system and be purged with an inert gas, sensor fluid or the like so as to detect any leaks from the inner tube. If desired, inlet and outlet fittings can be provided on each section of outer tubing between fittings so that a heated or cooled fluid can be passed through the outer tube to thereby maintain process temperature of the process fluid within the inner tube. The outer tube can be used to provide additional levels of protection from leakage of gases through walls of the inner tube when the tube is made from a material which has some permeability to the gases being transported therethrough.

Although a preferred embodiment of the dual containment fitting has been specifically described and illustrated herein, many modifications and variations will be apparent to those skilled in the art. Accordingly, it is to be understood that, within the scope of the appended claims, the dual containment fitting according to principles of this invention may be embodied other than as specifically described herein. The scope of the invention is defined by the following claims.

What is claimed:

1. A dual containment fitting for sealingly joining together the flared ends of concentric inner and outer tubes, the dual containment fitting comprising:

an intermediate annular body with first and second ends and having a bore therethrough;

an annular fitting body with first and second ends and having a bore therethrough, wherein the fitting body is threadably engaged at its first end within the bore at the first end of the intermediate body, and wherein the flared end portion of the inner tube is compressively engaged between the fitting body and the intermediate body to form a first air- and water-tight seal therebetween; and an annular nut having first and second ends and a bore therethrough, wherein the nut is threadably engaged at its second end about the second end of the intermediate body, and wherein the flared portion of the outer tube is compressively engaged between the intermediate body and the nut to form a second air- and water-tight seal therebetween.

2. The dual containment fitting as recited in claim 1, wherein the intermediate body comprises a nose portion at its second end having a taper on its outside surface and a set of threads adjacent the nose portion, wherein the nose portion is configured to be inserted within the flared end of the outer tube so that the flared end of the outer tube is compressively engaged between the nose portion of the intermediate body and the annular nut.

3. The dual containment fitting as recited in claim 2, wherein the nut bore has a threaded portion at its second end, and a non-threaded portion adjacent the threaded portion that extends to the nut first end, the non-threaded portion being configured to accommodate placement of the flared end of the outer tube therein, wherein the non-threaded portion includes an annular shoulder at the first end, and wherein the set of threads of the intermediate body is threadably engaged with the threaded bore of the nut and the flared end of the outer tube is compressively engaged between the taper of the nose portion of the intermediate body and the nut annular shoulder.

4. The dual containment fitting as recited in claim 1 wherein the fitting body has an outside surface comprising a nose portion at one end having a taper, and a set of threads adjacent the nose portion, wherein the nose portion is configured to be inserted within the flared end of the inner tube so that the flared end of the outer tube is compressively engaged between the nose portion of the fitting body and the intermediate body.

5. The dual containment fitting as recited in claim 4, wherein the intermediate body bore has a threaded portion at its first end, a first non-threaded portion adjacent the threaded portion that is configured to accommodate placement of the flared end of the inner tube therein, a second non-threaded portion adjacent the first non-threaded portion that extends to the second end of the bore and is configured to accommodate placement of a non-flared portion of the inner tube therein, and an annular shoulder at a junction between the first and second non-threaded portions, wherein the set of threads of the fitting body is threadably engaged with the threaded bore of the intermediate body and the flared end of the inner tube is compressively engaged between the taper of the nose portion of the fitting body and the annular shoulder of the intermediate body.

6. The dual containment fitting as recited in claim 1, wherein the intermediate body, fitting body, and nut are each formed from a fluoropolymer material.

7. The dual containment fitting as recited in claim 1, wherein the intermediate body has an outside surface comprising a flanged portion at its first end and a threaded portion adjacent the flanged portion, wherein a mounting nut is threadably engaged with the threaded portion to accommodate attachment of the intermediate body to a planar wall surface interposed therebetween.

8. A dual containment fitting for sealingly joining together the flared ends of concentric inner and outer tubes, the dual containment fitting comprising:

a fitting body having a bore therethrough, the fitting body including a nose portion with a taper on the outer surface of its one end and a set of threads on its outer surface extending away from the nose portion, the nose portion configured to be inserted into the flared end of an inner tube;

an intermediate body having a bore therethrough, the intermediate body including a nose portion with a taper on the outer surface of its one end and a set of threads on its outer surface extending away from the nose portion, the nose portion configured to be inserted into the flared end of an outer tube, the intermediate body bore comprising;

a first portion having a first diameter;

a second portion adjacent the first portion having a second diameter greater than the first diameter, wherein the junction of the first and second portions is defined by an annular shoulder; and a third portion comprising a set of threads adjacent the second portion, wherein the fitting body and intermediate body are joined together by engaging the threads on the outer surface of the fitting body with the threads on the third portion of the intermediate body bore, such that the fitting body nose portion extends into the second diameter portion of the intermediate body for sealingly compressing the flared end of the inner tube between the fitting body nose portion and the intermediate body annular shoulder; and an annular nut having a bore therethrough, the bore comprising:

a first portion having a first diameter;

a second portion adjacent the first portion having a second diameter greater than the first diameter, wherein the junction of the first and second portions is defined by an annular shoulder; and a third portion comprising a set of threads adjacent the second portion, wherein the intermediate body and nut are joined together by engaging the threads on the outer surface of the intermediate body with the threads on the third portion of the nut bore, such that the intermediate body nose portion extends into the second diameter portion of the nut for sealingly compressing the flared end of the outer tube between the intermediate body nose portion and the nut annular shoulder.

9. The dual containment fitting as recited in claim 8, wherein the intermediate body comprises a second set of threads along the outer surface adjacent the first set of threads, wherein the second set of threads have a diameter greater than the first set of threads and are configured to have a thread pattern opposite from the first set of threads.

10. The dual containment fitting as recited in claim 9, wherein the intermediate body comprises a radially extending flange positioned at an end opposite from the nose portion and adjacent the second set of threads, wherein the flange has a diameter greater than the diameter of the second set of threads.

11. The dual containment fitting as recited in claim 10, wherein the flange has an annular radially extending surface facing the nose portion, wherein a groove is within the annular surface and extends circumferentially therearound, and an O-ring seal is disposed within the groove.

12. The dual containment fitting as recited in claim 11, comprising a mounting nut threadably engaged with the second set of threads of the intermediate body and configured to accommodate mounting of the intermediate body through an opening in a wall surface interposed between the intermediate body flange and the mounting nut.

13. The dual containment fitting as recited in claim 8, wherein the fitting body comprises an extended diameter portion that extends radially outward from the outer surface to facilitate engagement of the fitting body by a tool to rotate the fitting body.

14. The dual containment fitting as recited in claim 8, wherein the annular nut comprises a generally cylindrical housing that is configured to have a hexagonal shape to facilitate engagement of the annular nut by a tool to rotate the annular nut.

15. The dual containment fitting as recited in claim 8, wherein the intermediate body, fitting body, and annular nut are each formed from a fluoropolymer material.

16. A dual containment fitting for sealingly joining together the flared ends of concentric inner and outer tubes, the dual containment fitting comprising:

a fitting body having a bore therethrough, the fitting body including a cylindrical nose portion with a taper on the outer surface of its end, a set of threads on the outer surface extending away from the nose portion, and a radially extending portion adjacent the threads for engagement by a tool to rotate the fitting body, the fitting body nose portion configured to be inserted into the flared end of an inner tube;

an intermediate body have a bore therethrough, the intermediate body including a cylindrical nose portion having a taper on the outer surface of its end, a first set of threads on its outer surface adjacent the nose portion, a second set of threads adjacent the first set of threads, and a radially extending flange adjacent the second set of threads, the bore comprising:

a first portion having a first diameter;

a second portion adjacent the first portion having a second diameter greater than the first diameter, wherein the junction of the first and second portions is defined by an annular shoulder; and a third portion comprising a set of threads which are adjacent the second portion and which extend through the radial flange portion of the bore, wherein the annular fitting body and intermediate body are joined together by engaging the fitting body threads with the threads on the third portion of the intermediate body bore, such that the fitting body nose portion extends into the second diameter portion of the intermediate body for sealingly compressing the flared end of the inner tube between the fitting body nose portion and the intermediate body shoulder; and an annular nut having a bore therethrough, the bore comprising:
  a first portion having a first diameter;
  a second portion adjacent the first portion having a second diameter greater than the first diameter, wherein the junction of the first and second portions is defined by an annular shoulder; and
  a third portion comprising a set of threads adjacent the second portion, wherein the intermediate body and nut are joined together by engaging the first set of threads on the outer surface of the intermediate body with the threads of the nut bore, such that the intermediate body nose portion extends into the second diameter portion of the nut for sealingly compressing the flared end of the outer tube between the intermediate body nose portion and the nut annular shoulder.

17. A dual containment fitting for sealingly joining together the flared ends of concentric inner and outer tubes, the dual containment fitting comprising:

a fitting body with first and second ends and having a bore therethrough, the fitting body including:
  a nose portion with a taper on the outer surface of the first end, wherein the nose portion is configured to be inserted into the flared end of an inner tube;
  a first set of threads on its outer surface extending away from the nose portion;
  a radially extending flange adjacent the first set of threads; and
  a second set of threads on its outer surface between the flange and the second end;

an intermediate body with first and second ends and having a bore therethrough, the intermediate body including:
  a nose portion with a taper on the outer surface of the second end, wherein the nose portion is configured to be inserted into the flared end of an outer tube;
  a set of threads on its outer surface extending away from the nose portion; and
  a radially extending flange positioned at its first end, wherein said flange has an annular surface facing away from the first end, wherein a groove is within the annular surface and extends circumferentially therearound and a seal is disposed within the groove;

the intermediate body bore comprising;
  a first portion having a first diameter;
  a second portion adjacent the first portion having a second diameter greater than the first diameter, wherein the junction of the first and second portions is defined by an annular shoulder; and
  a third portion comprising a set of threads adjacent the second portion, wherein the fitting body and intermediate body are joined together by engaging the first set of threads on the outer surface of the fitting body with the threads on the third portion of the intermediate body bore, such that the fitting body nose portion extends into the second diameter portion of the intermediate body for sealingly compressing the flared end of the inner tube between the fitting body nose portion and the intermediate body annular shoulder; and an annular nut with first and second ends and having a bore therethrough, the bore comprising:
  a first portion at the first end having a first diameter;
  a second portion adjacent the first portion having a second diameter greater than the first diameter, wherein the junction of the first and second portions is defined by an annular shoulder; and
  a third portion comprising a set of threads adjacent the second portion, wherein the intermediate body and nut are joined together by engaging the first set of threads on the outer surface of the intermediate body with the threads on the third portion of the nut bore, such that the intermediate body nose portion extends into the second diameter portion of the nut for sealingly compressing the flared end of the outer tube between the intermediate body nose portion and the nut annular shoulder.

18. The dual containment fitting as recited in claim 17, comprising a mounting nut threadably engaged with the second set of threads on the fitting body and configured to accommodate mounting of the fitting body through an opening in a wall surface interposed between the fitting body flange and the mounting nut so that when mounted, the seal in the intermediate body flange is in sealing engagement with a surface of the wall.

19. The dual containment fitting as recited in claim 17, wherein the annular nut has an outer surface which has a hexagonal shape at its second end to facilitate engagement of the annular nut by a tool to rotate the annular nut.

20. The dual containment fitting as recited in claim 17, wherein the intermediate body, fitting body, and annular nut are each formed from a fluoropolymer material.

21. A system for transporting a fluid through an inner tube which is within an outer tube, wherein the flared ends of the concentric inner and outer tubes are sealingly joined together, the system comprising:

at least one dual containment fitting comprising:
  an intermediate annular body with first and second ends and having a bore therethrough;
  an annular fitting body with first and second ends and having a bore therethrough, wherein the fitting body is threadably engaged at its first end within the bore at the first end of the intermediate body, and where the flared end portion of the inner tube is compressively engaged between the fitting body and the intermediate body to form a first air- and water-tight seal therebetween; and
  an annular nut having first and second ends and a bore therethrough, wherein the nut is threadably engaged at its second end about the second end of the intermediate body, and wherein the flared portion of the outer tube is compressively engaged between the intermediate body and the nut to form a second air- and water-tight seal therebetween; and a second fitting in fluid communication with said dual containment fitting, said second fitting comprising:
  an intermediate annular body with first and second ends having a bore therethrough;
  an annular nut having first and second ends and a bore therethrough, wherein the nut is threadably engaged at its second end about the second end of the intermediate body, and wherein the flared portion of the outer tube is compressively engaged between the intermediate body and the nut to form an air- and water-tight seal therebetween; and
  an inner tube extending through the outer tube and through the intermediate body and annular nut assembly.

* * * * *

UNITED STATES PATENT AND TRADEMARK OFFICE
CERTIFICATE OF CORRECTION

PATENT NO.   : 5,498,036
DATED        : March 12, 1996
INVENTOR(S)  : Kenji A. Kingsford It is certified that error appears in the above-indentified patent and that said Letters Patent is hereby corrected as shown below:

Column 1, line 22, change "deposed" to -- disposed --.
Column 1, line 56, after "that" delete "is".

Column 3, line 54, change "treadably" to -- threadably --.

Column 4, line 65, before "adjacent" delete "an".

Column 5, lines 47,48, change "A annular" to
          -- An annular --.

Column 6, line 1, change "a inner" to -- an inner --.
Column 6, line 66, change "a inner" to -- an inner --.

Column 7, line 44, change "an hexagonal" to
          -- a hexagonal --.

Column 8, line 16, change "fit" to -- fitted --.
Column 8, line 56, change "an hexagonal" to
          -- a hexagonal --.

Column 10, line 43, before "thereby" delete "to".

Column 12, line 62, replace "outer tube" with
           -- inner tube --.

UNITED STATES PATENT AND TRADEMARK OFFICE
CERTIFICATE OF CORRECTION

PATENT NO. : 5,498,036
DATED : March 12, 1996
INVENTOR(S) : Kenji A. Kingsford

It is certified that error appears in the above-indentified patent and that said Letters Patent is hereby corrected as shown below:

Column 13, line 38, after "comprising" replace the semicolon with a colon.

Column 14, line 52, change "have" to -- having --.

Column 16, lines 18,19,20, replace "fitting body" with -- intermediate body -- (all occurrences).

Signed and Sealed this

Twenty-second Day of October, 1996

Attest:

BRUCE LEHMAN

Attesting Officer

Commissioner of Patents and Trademarks